J. Cockburn.
Pen & Pencil Case.
N° 19,831.   Patented Apr. 6, 1858.

UNITED STATES PATENT OFFICE.

JOHN COCKBURN, OF NEW YORK, N. Y.

IMPROVEMENT IN PEN AND PENCIL CASES.

Specification forming part of Letters Patent No. 19,831, dated April 6, 1858.

*To all whom it may concern:*

Be it known that I, JOHN COCKBURN, of the city, county, and State of New York, have invented a new and Improved Pen and Pencil Case; and I do hereby declare that the following is a full, clear, and exact description of the same, reference being had to the annexed drawings, making a part of this specification, in which—

Figure 1:
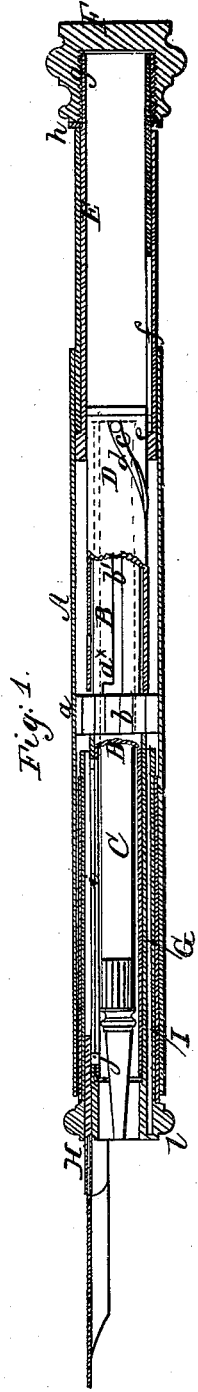
Figure 2:
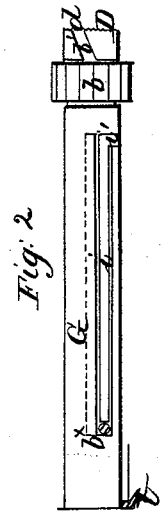
Figure 3:
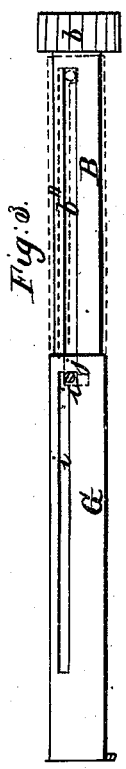

Figure 1 is a longitudinal vertical section of my improvement. Fig. 2 is an external view of the pen-tube. Fig. 3 is an external view of the pen-tube extended, so as to show the tube which incloses the pencil-tube.

Similar letters of reference indicate corresponding parts in the several figures.

This invention consists in a peculiar arrangement of means for operating the pen and pencil, whereby the pen and pencil are shoved in and out at the same end of the case, the construction of the case rendered extremely simple and portable, and the usual extension-case also obtained.

To enable those skilled in the art to fully understand and construct my invention, I will proceed to describe it.

A represents the external tube, which may be of cylindrical or any ornamental form, and B is a tube which is considerably smaller in diameter than the tube A, but is nearly the same length. The tube B is secured permanently within the tube A, as shown at $a$, a boss $b$ being attached to the tube B and soldered to tube A. (See Fig. 1.)

Within the tube B the pencil-tube C is placed. The tube C is constructed in the usual way, or similar to all ever-pointed-pencil tubes, and is allowed to slide freely within tube B. The inner part of the tube B is slotted longitudinally, as shown at $b'$, and the inner end of the pencil-tube C has a pin $c$ attached, which projects through the slot $b'$. (See Fig. 1.)

On the inner part of the tube B a spirally-slotted tube D is placed. The pin $c$ of the pencil-tube C projects into the spiral slot $d$ of tube D, as shown clearly in Fig. 1. The tube D is equal in length to the inner part of the tube B from the boss $b$. The latter, it will be seen, is a complete ring and girdles the tube G. The outer end of the tube D has a pin $e$ attached to it, and this pin fits in a slot $f$, made longitudinally in a tube E, which is allowed to slide within the tube A between said tube and the tube D. On the outer end of the tube E a screw-thread $g$ is formed to receive the head F, the inner edge of which bears against a collar $h$ on tube E. (See Fig. 1.)

On the outer part of the tube B a tube G is placed and allowed to slide freely. This tube has a longitudinal slot $i$ made through it, and a pen-slide H is fitted on the tube G. The rear part or shank of the pen-slide H, it will be seen, encompasses the tube G and abuts against the boss $b$. The pen-slide H has a pin $j$ attached to it, and this pin fits in the slot $i$ and also in a slot $b''$ in tube B. The tube G is attached to a tube I, which encompasses the pen-slide H, and a rim or annular bead $l$ is attached to the outer end of tube I, the tube I being allowed to slide within the tube A.

The several tubes of course may be covered with silver or gold, either plain or corrugated, engraved or ornamented in any manner, and the outer part of tube E will serve as a reserve for leads.

From the above description it will be seen that by turning the head F the tube D will also be turned, as its pin $e$ fits in the slot $f$ of the tube E, to which the head F is attached, the tube E forming the extension-slide, and consequently it will be seen that the spiral slot $d$ will operate the tube C or move it, in and out, as the pin $c$ of tube B fits in the spiral slot $d$. It will also be seen that by drawing the tube G outward from the tube A and turning it a trifle to the right, so that its slot $i$ will be in line with the slot $b''$ of the tube B, and then shoving the tube G inward, the pen-slide H will be shoved inward with it, in consequence of the pin $j$ being fitted in a notch $i'$ at the inner end of slot $i$; but if the tube G, when extended, be turned a trifle to the left the pin $j$ of the pen-slide will be fitted in a notch $b^\times$ at the outer end of slot $b''$ and the tube G, when shoved inward, will not carry the pen-slide with it, the latter being left so that the pen will project from the case ready for use.

I would remark that when the pencil-tube C is fully extended the pin $c$ fits in a notch $a^\times$ at the outer end of the slot $b'$, said notch preventing the pencil-tube from being casually shoved inward.

By this improvement the pen and pencil are not only both shoved out from the same end of the case, but a strong, simple, and portable case is also obtained, and the operation of the pen and pencil made so very distinct that neither is liable to be operated or shoved out from the case by mistake.

It is new in pen and pencil slides, so far as I am aware, to have the boss $b$ made in the form of a complete ring, so as to girdle the tube B. It is also new to have the rear or shank of the pen-slide H made to encompass the tube G. The usual construction is to have a boss consisting of a small stop riveted to tube B. This method of arranging the boss is necessarily lacking in strength, and by the backward movement of the pen and pencil slides the boss is soon broken off. Besides, the upper portion of the boss, to which the exterior or silver case is soldered, is necessarily so small that sufficient contact-surface for a secure fastening between the boss and exterior tube cannot be obtained.

The rear or shank of the pen-slide H does not usually girdle the tube G, but covers only a portion of its exterior. The shank of slide H is thus left with a broad opening throughout its entire length. This is necessary in order to allow the said shank part to pass the boss, and the boss, as before stated, is not made in the form of a complete ring, because the shank part of the pen-slide is required to pass the boss. Now, in my improvement the shank of the pen-slide does not pass the boss $b$, but abuts against it.

The common plan of arranging the shank of the pen-slide H is defective, because the open space before named renders it weak and infirm by use. Besides, the arrangement is also expensive as compared with mine, for it requires more metal and much more labor in the fitting. By having the shank of the pen-slide made to encompass the tube G the slide is made stronger, more secure, more compact, and cheaper, and by having the boss $b$ so made as to girdle the tube B the boss is rendered firm, so that it cannot break away.

I do not claim separately operating the pencil-tube C by means of the spirally-slotted tube D, for this has been previously done; but,

Having thus described my invention, what I claim as new, and desire to secure by Letters Patent, is—

The arrangement and combination, as herein shown and described, of a pen-slide H, which girdles its tube G, with a boss $b$, which latter girdles its tube B, for the purposes set forth.

JOHN COCKBURN.

Witnesses:
   JOHN A. CHIPMAN,
   W. TUSCH.